(12) United States Patent
Bultez et al.

(10) Patent No.: US 10,471,566 B2
(45) Date of Patent: Nov. 12, 2019

(54) METHOD FOR DETERMINING LOCATION OF A LENS MACHINING TOOL IN A TURNING MACHINE CONFIGURED FOR MACHINING OPHTALMIC LENSES

(71) Applicant: ESSILOR INTERNATIONAL (COMPAGNIE GENERALE D'OPTIQUE), Charenton-le-Pont (FR)

(72) Inventors: Xavier Bultez, Charenton-le-Pont (FR); Jerome Moine, Charenton-le-Pont (FR); Guillaume Bolteau, Charenton-le-Pont (FR); Jean-Pierre Chauveau, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 354 days.

(21) Appl. No.: 15/502,712

(22) PCT Filed: Aug. 7, 2015

(86) PCT No.: PCT/EP2015/068297
§ 371 (c)(1),
(2) Date: Feb. 8, 2017

(87) PCT Pub. No.: WO2016/023835
PCT Pub. Date: Feb. 18, 2016

(65) Prior Publication Data
US 2017/0232575 A1    Aug. 17, 2017

(30) Foreign Application Priority Data
Aug. 13, 2014 (EP) .................................. 14306274

(51) Int. Cl.
*B24B 49/03* (2006.01)
*B23Q 17/22* (2006.01)
(Continued)

(52) U.S. Cl.
CPC .......... *B24B 49/03* (2013.01); *B23Q 17/2233* (2013.01); *B24B 13/005* (2013.01);
(Continued)

(58) Field of Classification Search
None
See application file for complete search history.

(56) References Cited

U.S. PATENT DOCUMENTS 6,071,176 A * 6/2000 Kruis .................. B24B 1/00
33/28
7,440,814 B2 * 10/2008 McPherson ........... B24B 13/005
451/42
(Continued)

FOREIGN PATENT DOCUMENTS

JP    S58 71054 A    4/1983
WO   2014080207 A2   5/2014

OTHER PUBLICATIONS

International Search Report, dated Mar. 23, 2016, from corresponding PCT application.

*Primary Examiner* — Ramesh B Patel
(74) *Attorney, Agent, or Firm* — Young & Thompson (57) ABSTRACT

Disclosed is a method for determining location of a lens machining tool (24) having an offset location according to a first direction (Y) smaller than a first predetermined threshold, including the steps of manufacturing a calibration piece (10) according to a predetermined theoretical geometry by using the lens machining tool for providing a at least partially annular groove in a main surface of the calibration piece, the at least partially annular groove being configured to form at least one sharp edge defining a slope discontinuity on the main surface; measuring a distance between the at least one sharp edge and a turning center of the calibration piece for providing data of geometrical characteristics of the calibration piece; and deducing from the measured data a
(Continued)

location of the lens machining tool according to a second direction (X) distinct from the first direction.

20 Claims, 4 Drawing Sheets (51) Int. Cl.
    *G05B 19/402*     (2006.01)
    *B24B 13/06*     (2006.01)
    *B24B 13/005*     (2006.01)
    *B24B 49/00*     (2012.01)

(52) U.S. Cl.
    CPC .............. *B24B 13/06* (2013.01); *B24B 49/00* (2013.01); *G05B 19/402* (2013.01); *G05B 2219/36204* (2013.01)

(56) References Cited

U.S. PATENT DOCUMENTS

| | | | | |
|---|---|---|---|---|
| 8,004,694 | B2* | 8/2011 | Lee | F42B 35/02 |
| | | | | 356/228 |
| 9,415,478 | B2* | 8/2016 | Castro | B29D 11/00942 |
| 9,671,618 | B2* | 6/2017 | Allione | G01M 11/025 |
| 10,215,888 | B2* | 2/2019 | Castro | B29D 11/00942 |
| 2010/0245850 | A1* | 9/2010 | Lee | F42B 35/02 |
| | | | | 356/625 |
| 2017/0235295 | A1* | 8/2017 | Bultez | G01M 11/02 |
| | | | | 700/157 |

* cited by examiner

METHOD FOR DETERMINING LOCATION OF A LENS MACHINING TOOL IN A TURNING MACHINE CONFIGURED FOR MACHINING OPHTALMIC LENSES

FIELD OF THE INVENTION

The invention relates to the manufacturing of lenses such as ophthalmic lenses, and in particular to the determining of a location of a lens machining tool in a turning machine configured for machining ophthalmic lenses.

BACKGROUND ART

U.S. Pat. No. 7,440,814 describes a method for auto-calibration of a tool in a single point turning machine used for manufacturing in particular ophthalmic lenses, method in which a test piece of predetermined geometry is cut with the tool and probed to obtain probe data. The method uses the probe data to mathematically and deterministically identify the necessary tool/machine corrections in two directions (X, Y) or direction directions (X, Y, Z) of the machine.

In particular, the method first describes a method for calibration of the tool in the X and Y directions (named 2D calibration concept). The method comprises the following steps:
  cut a predefined circular groove in a test piece, the groove defining a rotationally symmetrical geometry requiring both positive and negative tool contact angles;
  probe the test piece and in particular the curved section line of the circular groove and store the probe data obtained;
  execute best fit analysis of probe data to determine best fit of theoretical test piece geometry through the actual geometry of the test piece;
  determine X-offset by comparing actual to theoretical results;
  determine Y-offset by comparing actual to theoretical results;
  execute best fit analysis of probe data to determine best fit circle through a general tool tip geometry;
  analyse probe data to determine tool waving waviness errors in the Y-direction relative to a slope of a tangent angle between tool tip and test piece;
  store results of above analyses in appropriate memory register and/or data files; and
  use results by appropriately controlling the machine's X and Y axes to correct for X and Y axes.

Next, the method describes a method for calibration of the tool in the X, Y and Z directions (named 3D calibration concept). The method comprises the following steps:
  cut a predefined asymmetrical surface along two horizontal axes in a test piece, the surface defining a rotationally asymmetrical geometry;
  probe the test piece and store the probe data obtained;
  analyse probe data to determine general tool tip geometry, distance from center of best fit tool tip radius to center of lens rotation (in X-direction) and Y-errors relative to slope of tangent angle between the turning tool and the test piece;
  probe test piece while rotating it and store probe data;
  analyse probe data to determine Z-direction distance of cutting edge of the tool to center of axis of work rotation;
  store results of above analyses; and
  use results by appropriately controlling the machine's X, Y and Z axes to correct for X, Y and Z axes.

The method described above thus allows determining actual location of the tool at least in the X and Y directions, and optionally in the Z direction, relative to the machine, and correcting the position of the tool in the machine.

SUMMARY OF THE INVENTION

The invention is directed to a method for determining location of a lens machining tool in a turning machine configured for machining ophthalmic lenses, the method being particularly simple, convenient and economical to carry out.

The invention accordingly provides a method for determining location of a lens machining tool in a turning machine configured for machining ophthalmic lenses, said location of said lens machining tool being defined according to at least two directions in said turning machine, said method comprising the steps of manufacturing a calibration piece according to a predetermined theoretical geometry by using said lens machining tool, receiving data representative of geometrical characteristics of said calibration piece and processing said data for determining location of said lens machining tool relative to at least one of said two directions, said method being characterized in that:
  said lens machining tool has an offset location according to a first direction amongst said two directions, relative to a theoretical location, which is smaller than a first predetermined threshold;
  said step of manufacturing a calibration piece is configured to provide a at least partially annular groove in a main surface of said calibration piece, said at least partially annular groove being configured to form at least one sharp edge defining a slope discontinuity on said main surface;
  said step of receiving data of geometrical characteristics of said calibration piece comprises the step of measuring geometrical characteristics of said at least one sharp edge on said main surface; and
  said method further comprises the step of deducing, from said measured data representative of geometrical characteristics of said at least one sharp edge on said main surface, a location of said lens machining tool according to a second direction amongst said two directions, the second direction being distinct from the first direction.

The method according to the invention allows determining the location of the lens machining tool in the turning machine, by forming only a sharp edge on the main surface of the calibration piece in order to provide a slope discontinuity on said main surface.

The sharp edge is formed by providing the partially annular groove centered relative to a turning axis, also named turning center, of the calibration piece.

Such a sharp edge is particularly easy to identify and consequently, the step of measuring geometrical characteristics of said sharp edge may be carried out by using a common tool like for instance a microscope.

The accurate location of the tool can be determined even if there is a possible perpendicular defect of the machine between the second direction and the turning axis.

The method according to the invention is thus particularly simple, convenient and economical to carry out.

The first direction corresponds here to a direction named Y-direction while the second direction corresponds here to a direction named X-direction.

It should be noted that the second direction may be variable during the manufacturing of the lenses, in particular depending on the kinematics of the machine. It can be defined an instantaneous second direction where the tool reaches the center of the lens/calibration piece manufactured. Moreover, the perpendicularity in particular relative between the second direction and the turning axis is also defined where the tool reaches the center of the lens/calibration piece manufactured.

The theoretical location of the lens machining tool in the Y-direction corresponds to a perfect position in the turning machine, corresponding to the turning axis (or turning center).

The slope discontinuity defined by the sharp edge corresponds to a surface portion on the main surface which is continuous and not differentiable.

Features preferred as being very simple, convenient and economical for embodying the method according to the invention are mentioned below.

Said at least partially annular groove may have a predetermined local slope relative to said main surface, close to said at least one sharp edge.

Said predetermined local slope has a value greater than around 5° and preferably greater than around 10°, and smaller than around 90°.

Said step of manufacturing a calibration piece may comprise a first step of rough cutting and/or finishing the entire main surface of said calibration piece according to a predetermined general shape and a second step of forming said at least partially annular groove in said main surface, said first and second steps being successively carried out and said first step preceding or following said second step.

Said first step of rough cutting and/or finishing may be configured to provide a planar main surface or a curved main surface, and/or said second step of forming said at least partially annular groove is carried out by controlling said lens machining tool to be displaced relatively to the piece in a single direction in which said lens machining tool goes deep into said main surface or to be displaced relatively to the calibration piece according to a predetermined path defined in said first direction and also in a third direction distinct to said first and second direction, for instance a sinusoidal path or more generally a curved path.

More generally, the second step of forming said at least partially annular groove may be carried out by controlling said lens machining tool for providing the local slope close to the sharp edge of the groove, whatever the bottom of the groove, which bottom may be for instance planar or curved.

Said at least partially annular groove may be configured to have, in section, a profile which has a first sharp edge and a second sharp edge defining respectively a first slope discontinuity and a second slope discontinuity on said main surface, and which has a first local slope, close to said first sharp edge, and a second local slope, close to said second sharp edge, opposite to said first local slope.

The first local slope may have a first predetermined value and the second local slope may have a second predetermined value which is equal or distinct, in absolute value, to the first predetermined value and which is of opposite sign.

Said step of receiving data of geometrical characteristics of said calibration piece may comprise the step of measuring a distance between said first sharp edge and a turning center of said calibration piece and a distance between said second sharp edge and said turning center (the turning center being known and/or previously determined), or the step of measuring a first diameter of said groove at its first sharp edge and a second diameter of said groove at its second sharp edge; and said step of deducing said tool location according to said second direction comprises respectively the step of determining a half-sum of said measured distances of said first and second sharp edges relative to said turning center, or the step of determining a half of a half-sum of said measured diameters of said groove.

Measuring diameters of the groove may be carried out by measuring, in practice, the coordinates of a first set of at least three points located on the first/second sharp edge, next deducing the diameter of the circle passing through these three points.

Said at least partially annular groove may have two opposite sides which have each a similar predetermined local slope relative to said main surface, close respectively to said first sharp edge and to said second sharp edge, and/or said first sharp edge and said second sharp edge have a similar height in a plane perpendicular to a spindle axis of said turning machine, spindle axis on which said calibration piece is fixedly mounted and which rotates during said step of manufacturing said calibration piece.

Similar predetermined local slope may correspond here to same values, in absolute value, having opposite signs.

Said first predetermined threshold, which is bigger than said offset location according to said first direction, may be defined so that a first error regarding said tool location according to said second direction, which is due to said offset location according to said first direction, is smaller than a second predetermined threshold equal to around 10 μm, and preferably equal to around 5 μm, and more preferably equal to around 1 μm.

The first error is preferably defined by the following relationship:

$$\Delta dx1 = \sqrt{r^2 + dY^2} - r, \text{ where:}$$

"r" is a theoretical distance between the at least one sharp edge of said at least partially groove on said main surface and the turning center, according to said predetermined theoretical geometry, in micron; and 'dY" is said offset location according to said first direction, in micron.

Said at least partially annular groove may have a predetermined local slope relative to said main surface, close to said at least one sharp edge, which is greater than around 5° and preferably around 10°, and smaller than around 90°, and wherein said lens machining tool comprises a circular cutting edge which is configured to have a waviness defect and/or a worn portion smaller than around 2 μm when said step of manufacturing said calibration piece is carried out, so that a second error regarding said tool location according to said second direction, which is due to said waviness defect and/or worn portion of said lens machining tool, is smaller than a third predetermined threshold equal to around 11 μm, and preferably equal to around 5 μm and more preferably equal to around 1 μm.

The second error is preferably defined by the following relationship:

$$\Delta dx2 = \frac{\frac{dr}{\sin(a)}}{2},$$

where:

"dr" is said waviness defect and/or worn portion of said lens machining tool, in micron; and 'a' is said predetermined local slope of said at least partially annular groove, in degree.

The method may further comprise the following steps:

comparing said measured data representative of geometrical characteristics of said at least one sharp edge on said main surface to a theoretical data according to said predetermined theoretical geometry; and deducing, from said step of comparing, an offset location of said lens machining tool according to said second direction.

The method may further comprise the step of controlling said turning machine for repositioning said lens machining tool according to said determined offset location according to said second direction, if said offset location according to said second direction is bigger than a fourth predetermined threshold equal to around 20 µm, preferably equal to around 10 µm and more preferably equal to around 1 µm.

Said lens machining tool may comprise a circular cutting edge which is configured to have a waviness defect and/or worn portion smaller than around 2 µm when said step of manufacturing said calibration piece is carried out, and said method may further comprise the following steps:

manufacturing a first checking piece similar to said calibration piece by using said lens machining tool;

measuring geometrical characteristics of at least one sharp edge of said first checking piece and storing said measured data relating to said first checking piece;

manufacturing a plurality of ophthalmic lenses by using said lens machining tool;

manufacturing a second checking piece similar to said first checking piece by using said lens machining tool;

measuring geometrical characteristics of at least one sharp edge of said second checking piece; and comparing said measured data relating to said second checking piece to said stored measured data relating to said first checking piece and deducing a wear value of said lens machining tool.

The step of manufacturing a first checking piece similar to said calibration piece may be preceded by a step of controlling said turning machine for repositioning said lens machining tool according to said determined offset location according to said second direction, as described above.

More generally, the step of manufacturing a first checking piece similar to said calibration piece may be carried out according to predetermined settings of the turning machine and the steps of manufacturing the ophthalmic lenses and the second checking piece are also carried out according to the same predetermined settings of the turning machine.

The method may further comprise the step of replacing said lens machining tool if said determined wear value is bigger than a fifth predetermined threshold.

Said step of manufacturing a calibration piece may be carried out at a first height in said turning machine, and said method may further comprise, after deducing said tool location according to said second direction, the following steps:

storing said deduced tool location according to said first direction relating to said calibration piece;

manufacturing another calibration piece similar to said calibration piece, at a second height in said turning machine, distinct from said first height;

measuring geometrical characteristics of at least one sharp edge of said another calibration piece;

deducing, from said measured data representative of geometrical characteristics of said at least one sharp edge on said main surface of said another calibration piece, a tool location according to said second direction relating to said another calibration piece; and comparing said deduced tool locations relating to said calibration piece and to said another calibration piece and deducing a parallelism defect value according to said second direction relating to said lens machining tool.

Said lens machining tool may have a parallelism defect value according to said first direction which corresponds to the difference between said deduced tool locations respectively relating to said calibration piece and said another calibration piece, and which is smaller than a sixth predetermined threshold defined according to the difference between said first height and said second height, so that a third error regarding said parallelism defect value according to said second direction, which is due to said parallelism defect value according to said first direction, is smaller than a seventh predetermined threshold equal to around 1 µm/mm, and preferably equal to around 0.5 µm/mm, and more preferably equal to around 0.1 µm/mm.

The lens machining tool may have a first offset location according to said first direction, which is smaller than a first predetermined threshold, at said first height in said turning machine, and a second offset location according to said first direction, which is smaller than said first predetermined threshold, at said second height in said turning machine.

The third error may be defined by the following relationship:

$$\Delta dx3 = \text{abs}\left(\frac{dY1^2 - dY2^2}{2r(H2 - H1)}\right),$$

where:
"r" is a theoretical distance between the at least one sharp edge of said at least partially groove on said main surface, according to said predetermined theoretical geometry, in micron;

"H1" and "H2" are respectively the first and second heights, both in millimeter; and 'dY1" and "dY2" are the offset locations dY1 and dY2 respectively at the first and second heights, both in micron, and have distinct values when there is a parallelism defect value according to said first direction.

The invention also concerns a method for controlling a lens manufacturing process comprising the steps of:

determining the location of a lens machining tool in a turning machine as described above;

recording the value of said location of said machining tool in said turning machine;

repeating regularly steps a) to b) and checking the evolution of the said location of said machining tool in said turning machine over time; wherein the evolution of at least one parameter of said turning machine during the lens manufacturing process is checked over time and the evolution over time of at least said location of said machining tool in said turning machine is related with the evolution over time of the at least one parameter of said turning machine.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERRED EMBODIMENTS

Figure 1:
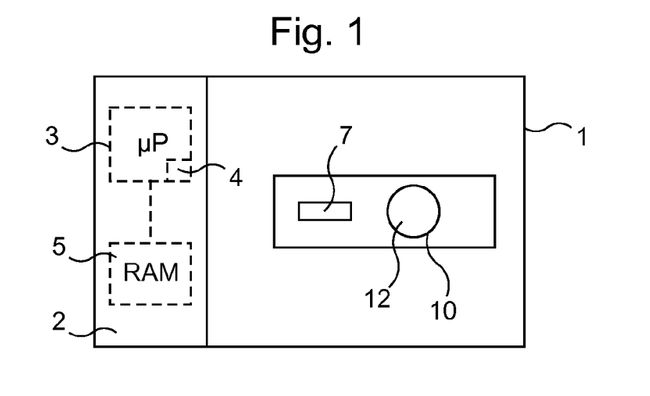
FIG. 1 is a partial and schematically view of a turning machine configured for machining ophthalmic lenses and/or calibration piece and for determining a location of a lens machining tool in the turning machine.

FIG. 1 shows a numerical-control "free-form" machine 1, numerical control denoting the set of equipment and software, the function of which is to give movement instructions to all the elements of the machine 1.

This machine 1 is configured for machining by turning (surfacing and optionally polishing) a face 12 of an optical article 10.

To this end, the machine 1 comprises a moveable machining arm 7 and a control unit 2 comprising a microprocessor 3 having a memory 4, in particular a non-volatile memory, allowing it to load and store software, in other words a computer program, which when it is executed in the microprocessor 3, allows the implementation of a manufacturing method according to the invention.

This non-volatile memory 4 is for example of the ROM ("read only memory") type.

The control unit 2 further comprises a memory 5, in particular a volatile memory, allowing data to be stored during the execution of the software and the implementation of the method.

This volatile memory 5 is for example of the RAM or EEPROM type (respectively "random access memory" and "electrically erasable programmable read only memory").

The control unit may be only at least partially integrated into the machine. In other words, the control unit may be arranged in part, or in whole, outside the machine.

The machine 1 can also correspond more generally to a manufacturing system comprising one or a plurality of machines configured for carrying out determined steps on the optical article (see below). Thus, the control unit forms a part of the manufacturing system and may comprise one or a plurality of control modules located inside or outside the machines.

The optical article 10 can be an ophthalmic lens and/or a calibration piece. In the case of an ophthalmic lens, the machine 1 can also be configured for polishing the face 12 and for edging a peripheral edge 13 (see FIG. 2) in order to form the ophthalmic lens.

The moveable machining arm 7 is configured to bear at an end a device 20 comprising a lens machining tool 24 (FIG. 2) and the control unit 2 is configured to control each of the steps of a method for determining location of the lens machining tool 24, and in particular its center, in the turning machine 1 configured for machining ophthalmic lenses.

Figure 2:
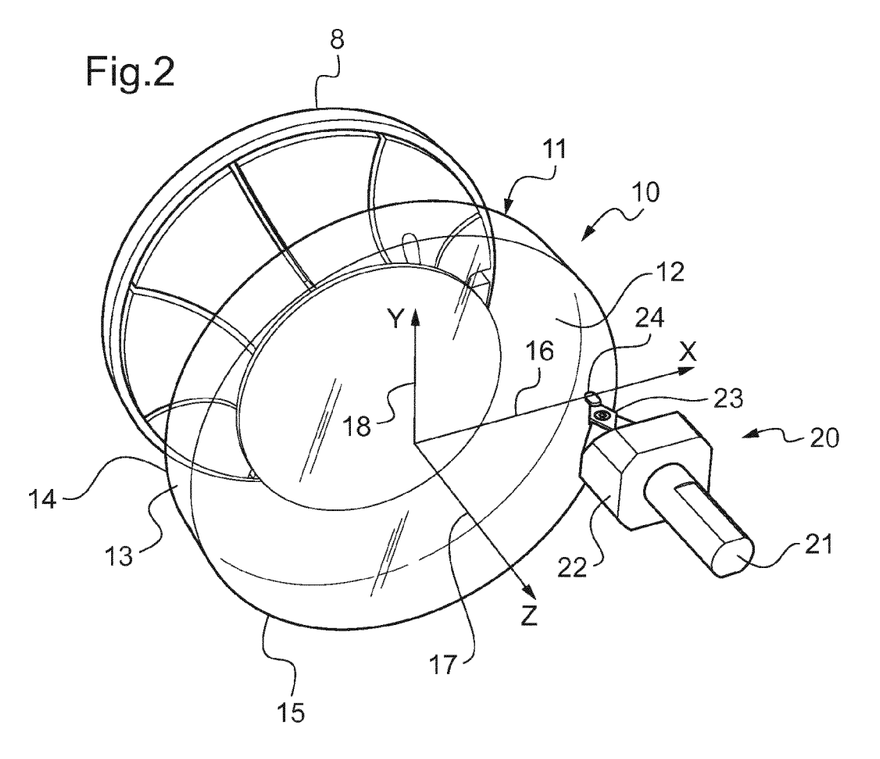
FIG. 2 is a partial and schematically perspective view showing the lens machining tool of the machine illustrated on FIG. 1, which face a calibration piece to be manufactured, which calibration piece is fixed on a lens holding system.

FIG. 2 shows a lens holding system 8 of the turning machine 1 which is configured to block in a predetermined position the optical article, here formed by a calibration piece 10.

The calibration piece 10 comprises an upper face 12, a lower face 11 opposite to the upper face 12 and a peripheral edge 13 linking the lower and upper faces 11 and 12.

The upper face 12 is configured to form a first face, also named rear face and the lower face 11 is configured to form a second face, also named front face. The second face is opposite to the first face.

The peripheral edge 13 is configured to form a peripheral outline having a first edge 15 linking the peripheral edge 13 to the first face 12 and a second edge 16 linking the peripheral edge 13 to the second face 11.

Here, the second face 11 and the first face 12 are both planar.

The lens holding system 8 comprises for instance an adhesive film (not represented) which has an adhesive face configured to be fixed on the lower face 11 of the piece 10.

The lens holding system 8 is configured to receive the piece 10 for machining by turning at least the first face 12 by using the device 20.

The lens holding system 8 is configured to be mounted on a spindle axis of the machine 1, spindle axis which rotates during the step of manufacturing the calibration piece 10, for rotating the piece 10 on itself during the machining.

The machine 1 comprises three directions, respectively a first direction 18, namely Y-direction, a second direction 16 perpendicular to the first direction 18, namely X-direction, and a third direction 17 perpendicular both to the first and second directions 18 and 16, namely Z-direction.

The location of the lens machining tool 24 is defined according to the three directions 16 to 18 in the turning machine 1.

The Z-direction 17 corresponds here to a turning axis, also named turning center, of the piece 10.

The device 20 comprises a pin 21 configured to be fastened to the moveable machining arm 7, a base 22 from which protrudes the pin 21, a tool support 23 formed by a projection of the base 22, at the opposite of the pin 21, and the lens machining tool 24 fixed to the tool support 23.

For carrying out the method for determining the location of the lens machining tool 24, the control unit 2 is configured to check if the lens machining tool 24 has an offset location according to the Y-direction, relative to a theoretical location, which is smaller than a first predetermined threshold (see in more detail below).

If no, the offset location according to the Y-direction of the tool 24 has to be corrected in order to be smaller than the first predetermined threshold. If yes, the control unit 2 is configured to control the step of manufacturing in the machine 1 the calibration piece 10 according to a predetermined theoretical geometry by using the tool 24.

The step of manufacturing the piece 10 is configured to provide a at least partially annular groove 25 in a main surface formed in the first face 12 of the piece 10, which groove 25 is centered relative to the turning center 17 of the piece 10.

The at least partially annular groove is configured to form at least one sharp edge 29, 30 defining a slope discontinuity on the main surface, and being easy to identify. The slope discontinuity defined by the sharp edge 29, 30 corresponds to a surface portion on the main surface which is continuous and not differentiable (see in more detail below).

Next, the control unit 2 is further configured to control the step of receiving data representative of geometrical characteristics of the calibration piece 10 and processing said data for determining location of the lens machining tool 24 relative to the three directions 16 to 18.

In particular, the control unit 2 is configured to control the step of measuring geometrical characteristics of the at least one sharp edge 29, 30 on the face 12, by using a common tool like for instance a microscope.

Next, the control unit 2 is further configured to control the step of deducing, from the measured data representative of geometrical characteristics of the at least one sharp edge 29, 30, the location of the center of the tool 24, according to the X-direction.

We will now describe in more detail in reference to FIGS. 3 to 7, the steps of manufacturing the groove 25, measuring the geometrical characteristics of the at least one sharp edge 29, 30 of the groove 25 and deducing the location of the center of the tool 24 in the machine 1.

The control unit 2 is configured to control a first step of rough cutting and/or finishing the entire main surface of the first face 12 of the calibration piece 10 according to a predetermined general shape and next, successively to the first step, a second step of forming the annular groove 25 in the first face 12. The first step of rough cutting and/or finishing is here configured to provide a planar main surface (FIG. 3) on the first face 12 of the piece 10.

Figure 3:
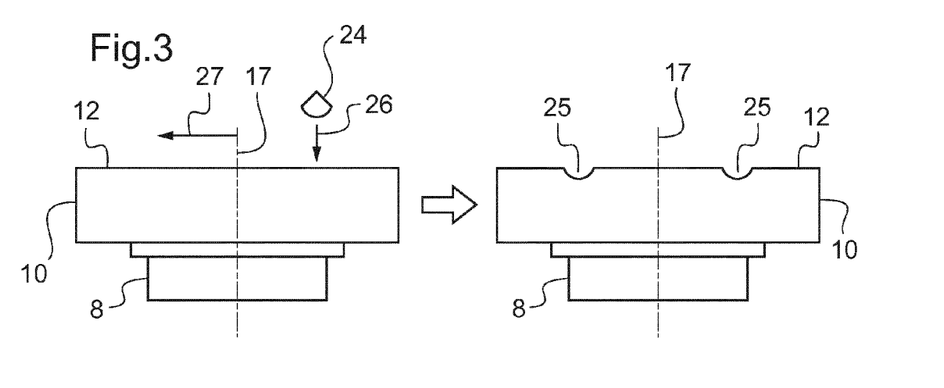
FIG. 3 represents schematically the calibration piece fixed to the lens holding system, before and after a step of manufacturing thereof, carried out according a first embodiment.

In reference to FIG. 3, the second step of forming the annular groove 25 is carried out by controlling the tool 24 to be displaced relatively to the calibration piece in a first way 26 extending in a single direction, the Z-direction Z, in which the tool 24, and in particular a circular cutting edge 32 that comprises the tool, goes deep into the first face 12.

Figure 4:
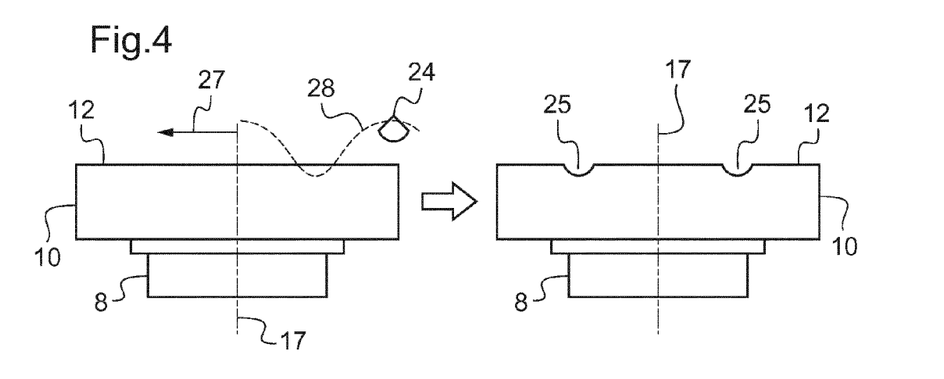
FIG. 4 is a view similar to FIG. 3, the step of manufacturing the calibration piece being carried out according a second embodiment.

In reference to FIG. 4, the second step of forming the annular groove 25 is carried out by controlling the tool 24 to be displaced relatively to the piece according to a predetermined path 28 defined in a way 27, extending both in the X-direction 16 and in the Z-direction 17.

The predetermined path 28 is for instance defined by a sinusoidal path or more generally a curved path.

Figure 5:
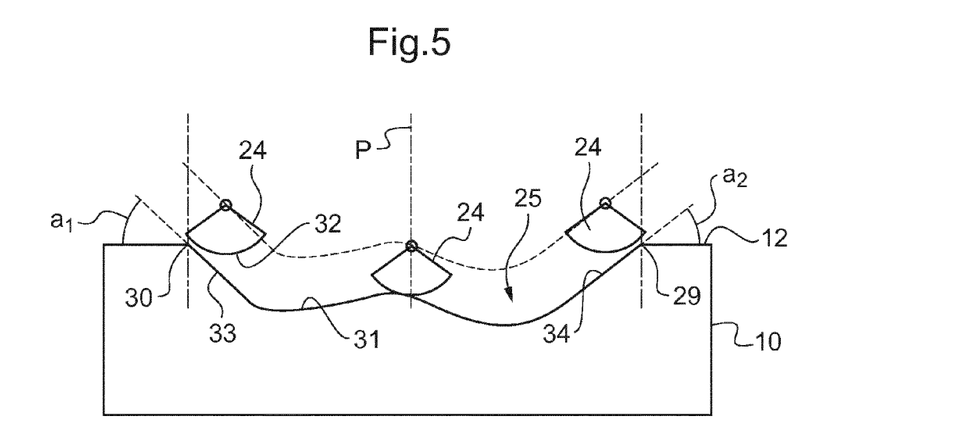
FIG. 5 show a detail of the calibration piece manufactured according the first or second embodiments.

In reference to FIG. 5, the groove 25 comprises a curved bottom 31 and two opposite ends, or sides, where are respectively formed two sharp edges 30 and 29.

In variant, the bottom of the groove can be planar rather than curved.

The second step of forming the groove 25 is carried out by controlling the tool 24 for further providing local slopes 33 and 34 relative to the first face 12 and close to the respective sharp edges 29 and 30, whatever the bottom 31 of the groove 25.

The groove 25 is here configured to have, in section, a profile which has the first sharp edge 29 and the second sharp edge 30 defining respectively a first slope discontinuity and a second slope discontinuity on the first face 12; and which has the first local slope 33 close to the first sharp edge 30, and the second local slope 34 close to the second sharp edge 29 and opposite to the first local slope 33.

The first local slope 33 has a first predetermined value a1 and the second local slope 34 has a second predetermined value a2 which is here equal, in absolute value, to the first predetermined value a1 and which is of opposite sign.

In other words, the first sharp edge 30 and the second sharp edge 29 have a similar height in a plane perpendicular to the spindle axis (not represented) of the turning machine 1.

In variant, the first and second predetermined values a1 and a2 are not equal but rather distinct.

Further, the first and second local slope 33 and 34 are here symmetrical relative to the center of the groove 25, which center corresponds to a known location of the center of the tool 24.

The first and second predetermined values a1 and a2 are here greater than around 5° and preferably greater than around 10°, and smaller than around 90°.

Figure 6:
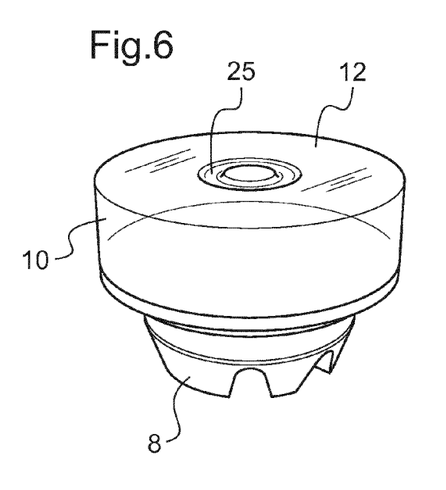
FIG. 6 is a perspective view of the calibration piece manufactured.

FIG. 6 shows the calibration piece 10 machined by the tool 24, according to any one of the way 26 or 28 mentioned above.

Figure 7:
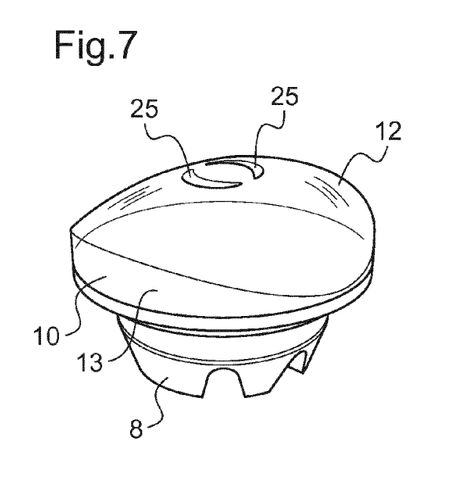
FIG. 7 is a view similar to FIG. 6, showing a variant of the calibration piece manufactured.

In a variant illustrated on FIG. 7, the first step of rough cutting and/or finishing may be configured to provide a curved main surface on the first face 12 of the piece 10; and the groove 25 can be only partially annular or interrupted in order to form two portions of groove.

The control unit 2 is configured to control a step of measuring a distance between the first sharp edge 30 and the turning center 17 of the piece 20 and a distance between the second sharp edge 29 and the turning center 17. The turning center 17 is known and/or previously determined.

The control unit 2 is further configured to control a step of determining a half-sum of the measured distances of the first and second sharp edges 30 and 29 relative to the turning center 17, for deducing the tool location at the groove center according to the X-direction.

In variant, the control unit 2 is configured to control a step of measuring a first diameter of the groove 25 at its first sharp edge 30 and a second diameter of the groove 25 at its second sharp edge 29.

Measuring diameters of the groove 25 may be carried out by measuring coordinates of a first set of at least three points located on each of the first and second sharp edge 30 and 29, and next deducing the diameter of the circle passing through these three points.

The control unit 2 is further configured to control a step of determining a half of a half-sum of the measured or deduced diameters of the groove 25, for deducing the tool location at the groove center according to the X-direction.

Figure 8:
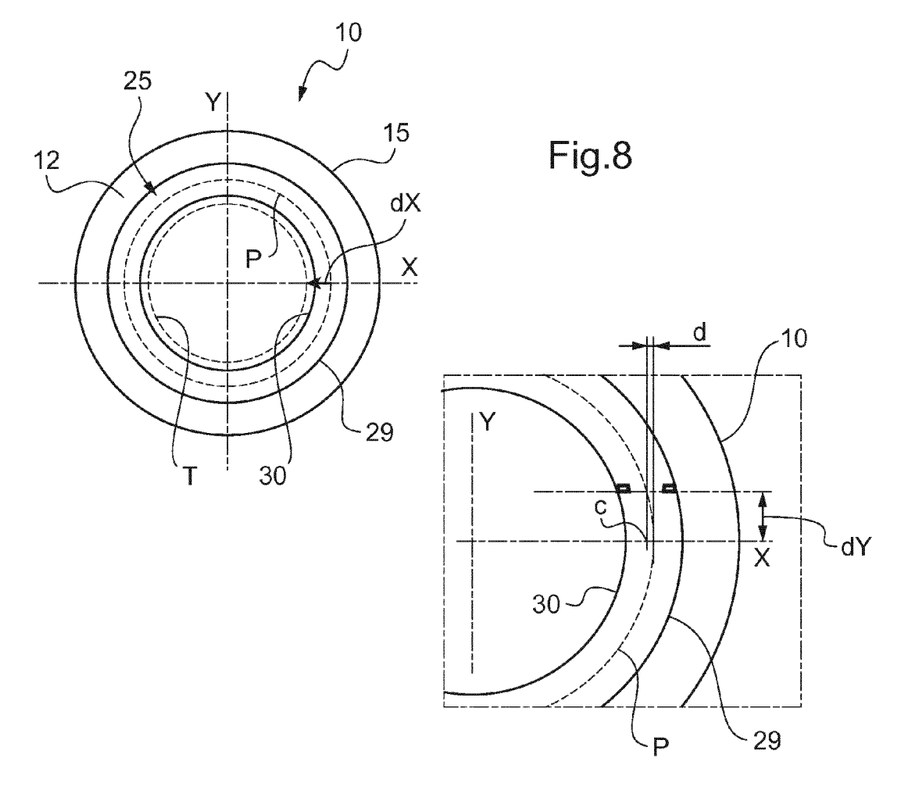
FIG. 8 is a top view of the calibration piece manufactured when the machine comprises a calibration defect relative to an X-direction, and further shows a detail of an annular groove formed on said calibration piece manufactured when the machine comprises a controlled calibration defect relative to an Y-direction.
Figure 9:
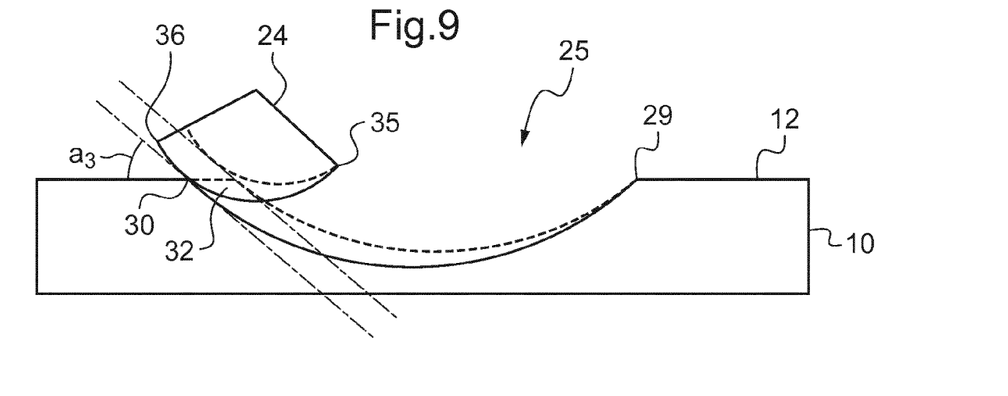
FIG. 9 is a schematic view showing the lens machining tool having a waviness defect and/or a worn portion.
Figure 10:
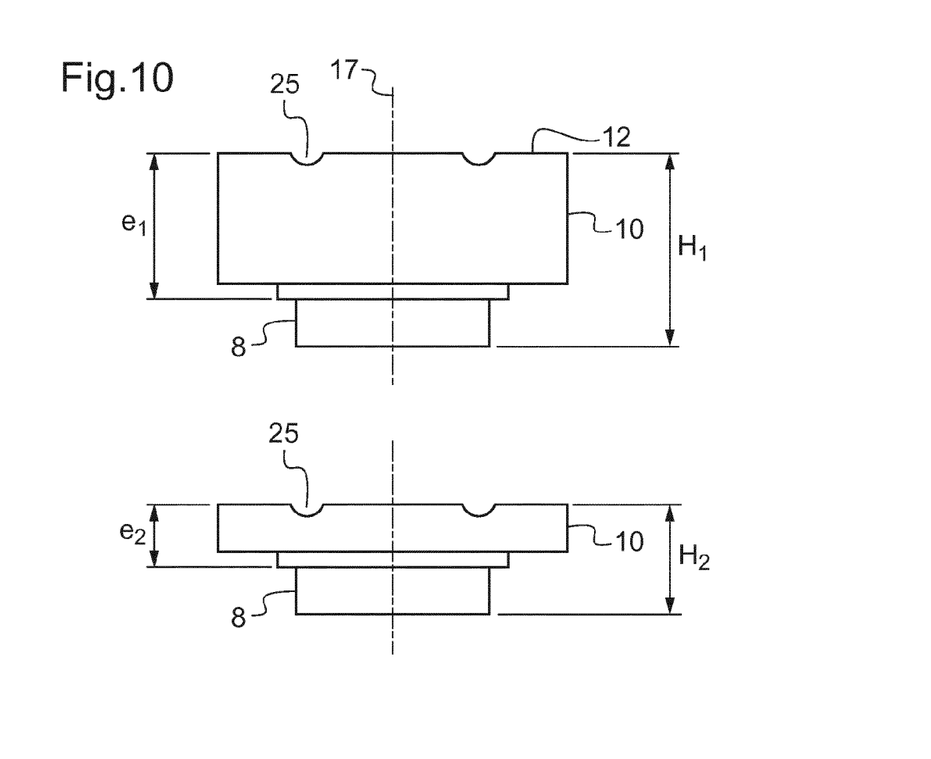
FIG. 10 shows two calibration pieces manufactured at different heights in the turning machine.

We will now describe in reference to FIGS. 8 to 10, using of the method described above.

In reference to FIG. 8, the method is used for determining or deducing a calibration defect of the machine 1 in the X-direction.

FIG. 8 shows the center P of the groove 25 which corresponds to the center of the tool 24, and a theoretical center T of a predetermined theoretical geometry of the groove.

The centers P and T of the machined and theoretical grooves are shifted by a distance dX also named offset location according to the X-direction.

In this case, the control unit 2 is configured to control a step of comparing the measured data representative of geometrical characteristics of the sharp edges 29 and 30 (distances or diameters) of the groove 25 to a theoretical data according to the predetermined theoretical geometry, which theoretical data has been previously received and stored by the control unit 2.

The control unit 2 is further configured to control a step of deducing, from the result of the comparison, an offset location dX of the tool 24 according to the X-direction.

The control unit 2 is further configured to control a step of controlling the machine 1 for repositioning the tool 24 according to the determined offset location dX, if the latter is bigger than a fourth predetermined threshold equal to around 20 μm, preferably equal to around 10 μm and more preferably equal to around 1 μm.

As mentioned above, the control unit 2 is configured to check if the lens machining tool 24 has an offset location according to the Y-direction, relative to a theoretical location, which is smaller than a first predetermined threshold.

Such an offset location dY can impact the tool location deduced in the step of the method described above.

In particular, an offset location dY can lead a first error d (detail in FIG. 8) regarding the tool location according to the X-direction.

The reference C in FIG. 8 corresponds to the center of the groove and thus to the center of the tool if the offset location dY is equal to zero.

The first error is preferably defined by the following relationship:

$$\Delta dx1 = \sqrt{r^2 + dY^2} - r, \text{ where:}$$

"r" is a theoretical distance between the sharp edge(s) 29, 30, or the center of the groove 25 corresponding to the location of the center of the tool 24, and the turning center of the piece 10, in micron; and 'dY" is the offset location according to the Y-direction, in micron.

The first predetermined threshold, which has to be bigger than the offset location according to the Y-direction, is preferably defined so that the first error is smaller than a second predetermined threshold equal to around 10 μm, and preferably equal to around 5 μm, and more preferably equal to around 1 μm.

For instance, if the radius r of the groove 25 is equal to 7.5 mm, the offset location dY has to be smaller than 122 μm.

Further, the control unit 2 can be configured to check if the tool 24 and in particular its circular cutting edge 32 has a waviness defect and/or worn portion preferably smaller than around 2 μm before the step of manufacturing the calibration piece 10 is carried out.

Such a waviness defect and/or worn portion of the tool 24 can impact the tool location deduced in the step of the method described above if the defect is not smaller than around 2 μm.

In particular, a waviness defect and/or worn portion of the tool 24 can lead a second error regarding the tool location according to the X-direction.

The second error is preferably defined by the following relationship:

$$\Delta dx2 = \frac{\frac{dr}{\sin(a)}}{2},$$

where:

"dr" is the waviness defect and/or worn portion of the tool 24, in micron; and 'a" is the predetermined local slope(s) of the groove 25, in degree.

A circular cutting edge 32 having a waviness defect and/or worn portion preferably smaller than around 2 μm should ensures that the second error is smaller than a third predetermined threshold.

A tool 24 having a waviness defect value dr smaller than around 2 μm and/or predetermined local slope(s) 33, 34 of the groove 25 having a value a greater than around 5° and preferably around 10°, and smaller than around 90°, allow to obtain the third predetermined threshold equal to around 11 μm, and preferably equal to around 5 μm and more preferably equal to around 1 μm.

For instance, if the waviness defect dr is smaller than 2 μm and the local slopes 33, 34 of the groove 25 have a value equal to 17°, the tool location according to the X-direction can be determined with an accuracy of approximately of +/−3.5 μm.

In reference to FIG. 9, the method is used for determining or deducing a wear value of the lens machining tool 24 and in particular of its circular cutting edge 32.

FIG. 9 shows the circular cutting edge 32 as being a zone which is asymmetrically worn between a first end 35 and an opposite second end 36 of the tool 24.

In this case, the control unit 2 is configured to control a step of manufacturing a first checking piece similar to the calibration piece 10 by using the tool 24, a step of measuring geometrical characteristics of the sharp edges formed on the first face of the first checking piece and the step of storing the measured data relating to the first checking piece.

The control unit 2 is further configured to control a step of manufacturing a plurality of ophthalmic lenses by using the tool 24 and next a step of manufacturing a second checking piece similar to the first checking piece by using the tool 24 and a step of measuring geometrical characteristics of the sharp edges formed on the first face of the second checking piece.

The control unit 2 is further configured to control a step of comparing the measured data relating to the second checking piece to the stored measured data relating to the first checking piece and deducing a wear value of the tool 24, on the basis of the relationship for the second error mentioned above.

The control unit 2 is configured to control a step of replacing the tool 24 if the determined wear value is bigger than a fifth predetermined threshold.

The determined wear value may correspond to the radial wear of the circular cutting edge 32 of the tool 24 and for instance, the fifth predetermined threshold is equal to around 10 μm.

The step of manufacturing a first checking piece similar to the calibration piece may be preceded by a step of controlling the machine for repositioning the tool according to the determined offset location dX, as described above.

More generally, the step of manufacturing a first checking piece similar to the calibration piece may be carried out according to predetermined settings of the machine and the steps of manufacturing the ophthalmic lenses and the second checking piece are also carried out according to the same predetermined settings of the machine.

In reference to FIG. 10, the method is used for determining or deducing a parallelism defect of value according to the X-direction.

FIG. 10 shows two calibration pieces 10 having each a predetermined thickness e1 and e2, which thicknesses are distinct, and being each machined at a predetermined height H1 and H2 in the machine 1, which heights are distinct.

In this case, the control unit 2 is configured to control the step of manufacturing a calibration piece 10 as described above, at the first height H1, and after deducing the tool location according to the X-direction, a step of storing the deduced tool location.

The control unit 2 is further configured to control a step of manufacturing another calibration piece 10 similar to the calibration piece, at the second height H2, a step of measuring geometrical characteristics of the sharp edges of the groove of the another calibration piece 10 and a step of deducing, from the measured data representative of geometrical characteristics of the sharp edges, a tool location according to the X-direction relating to the another calibration piece 10.

Next, the control unit 2 is configured to control a step of comparing the deduced tool locations relating to the calibration pieces 10 and a step of deducing a parallelism defect value according to the X-direction relating to the tool.

The tool may have a parallelism defect value according to the Y-direction which can impact the deduced parallelism defect value according to the X-direction.

The parallelism defect value according to the Y-direction may correspond to the difference between the deduced tool locations respectively relating to the calibration pieces.

More precisely, the tool may have a first offset location according to the Y-direction, which is smaller than the first predetermined threshold, at the first height H1, and a second offset location according to the Y-direction, which is smaller than the first predetermined threshold, at the second height H2.

The control unit 2 is configured to control a step of checking if the parallelism defect value according to the Y-direction is smaller than a sixth predetermined threshold, which is defined according to the difference between the first height H1 and the second height H2.

In particular, a parallelism defect value according to the Y-direction can lead a third error regarding the parallelism defect value according to the X-direction.

The third error may also be defined by the following relationship:

$$\Delta dx3 = \text{abs}\left(\frac{dY1^2 - dY2^2}{2r(H2 - H1)}\right),$$

where:
"r" is the theoretical distance between the sharp edge(s) of the groove, according to the predetermined theoretical geometry, in micron;
"H1" and "H2" are respectively the first and second heights, both in millimeter; and
'dY1" and "dY2" are the offset locations dY1 and dY2 respectively at the first and second heights, both in micron, and have distinct values when there is a parallelism defect value according to the first direction.

A parallelism defect value according to the Y-direction which is smaller than a sixth predetermined threshold should ensure that the third error regarding the parallelism defect value according to the X-direction is smaller than a seventh predetermined threshold, the latter being for instance equal to around 1 μm/mm, and preferably equal to around 0.5 μm/mm, and more preferably equal to around 0.1 μm/mm The control unit 2 is further configured to control a step of controlling a lens manufacturing process.

In this case, the control unit 2 is configured to control a step of determining the location of a lens machining tool in a turning machine as described above, a step of recording the value of the location of the machining tool in the turning machine, and a step of repeating regularly the two preceding steps and checking the evolution of the location of the tool in the machine over time.

The control unit 2 is further configured to control a step of checking over time the evolution of at least one parameter of the turning machine during the lens manufacturing process; and the evolution over time of at least the location of the tool in the machine is related with the evolution over time of the at least one parameter of the machine.

It should be more generally noted that the invention is not limited to the described and represented examples.

The invention claimed is:

1. A method for determining a location of a lens machining tool in a turning machine configured to manufacture ophthalmic lenses, said location of said lens machining tool being defined according to at least two directions in said turning machine, said method comprising:
  manufacturing a calibration piece according to a predetermined theoretical geometry by using said lens machining tool;
  receiving data representative of geometrical characteristics of said calibration piece; and
  processing said data for determining the location of said lens machining tool relative to at least one of said two directions:
    wherein said lens machining tool has an offset location according to a first direction among said two directions, relative to a theoretical location, which is smaller than a first predetermined threshold,
    the manufacturing the calibration piece is configured to provide an at least partially annular groove in a main surface of said calibration piece, said at least partially annular groove being configured to form at least one sharp edge defining a slope discontinuity on said main surface,
    the receiving the data of geometrical characteristics of said calibration piece comprises measuring geometrical characteristics of said at least one sharp edge on said main surface, and
    said method further comprises deducing, from said measured data representative of geometrical characteristics of said at least one sharp edge on said main surface, a location of said lens machining tool according to a second direction among said two directions, the second direction being distinct from the first direction.

2. The method according to claim 1, wherein said at least partially annular groove has a predetermined local slope relative to said main surface, close to said at least one sharp edge.

3. The method according to claim 2, wherein said predetermined local slope has a value greater than around 5° and smaller than around 90°.

4. The method according to claim 1, wherein said manufacturing a calibration piece comprises a first step of rough cutting and/or finishing the entire main surface of said calibration piece according to a predetermined general shape and a second step forming said at least partially annular groove in said main surface, said first and second steps being successively carried out and said first step preceding or following said second step.

5. The method according to claim 4, wherein said first step of rough cutting and/or finishing is configured to provide a planar main surface or a curved main surface, and/or said second step of forming said at least partially annular groove is carried out by controlling said lens machining tool to be displaced relatively to the calibration piece in a single direction in which said lens machining tool goes deep into said main surface or to be displaced relatively to the calibration piece according to a predetermined path defined in said first direction and in a third direction distinct to said first and second directions.

6. The method according to claim 1, wherein said at least partially annular groove is configured to have, in section, a profile which has a first sharp edge and a second sharp edge respectively defining a first slope discontinuity and a second slope discontinuity on said main surface, and which has a first local slope, close to said first sharp edge, and a second local slope, close to said second sharp edge, opposite to said first local slope.

7. The method according to claim 6, wherein said receiving data of geometrical characteristics of said calibration piece comprises measuring a distance between said first sharp edge and a turning center of said calibration piece and a distance between said second sharp edge and said turning center, or measuring a first diameter of said groove at its first sharp edge and a second diameter of said groove at its second sharp edge, and
said deducing said tool location according to said second direction respectively comprises determining a half-sum of said measured distances of said first and second sharp edges relative to said turning center, or determining a half of a half-sum of said measured diameters of said groove.

8. The method according to claim 7, wherein said at least partially annular groove has two opposite sides which have each a similar predetermined local slope relative to said main surface, respectively close to said first sharp edge and to said second sharp edge, and/or said first sharp edge and said second sharp edge have a similar height in a plane perpendicular to a spindle axis of said turning machine, said calibration piece being fixedly mounted on the spindle axis and which rotates during said manufacturing said calibration piece.

9. The method according to claim 1, wherein said first predetermined threshold, which is bigger than said offset location according to said first direction, is defined so that a first error regarding said tool location according to said second direction, which is due to said offset location according to said first direction, is smaller than a second predetermined threshold equal to around 10 µm.

10. The method according to claim 1, wherein said at least partially annular groove has a predetermined local slope relative to said main surface, close to said at least one sharp edge, which is greater than around 5°, and smaller than around 90°, and
wherein said lens machining tool includes a circular cutting edge which is configured to have a waviness defect and/or worn portion smaller than around 2 µm when said manufacturing said calibration piece is carried out, so that a second error regarding said tool location according to said second direction, which is due to said waviness defect and/or worn portion of said lens machining tool, is smaller than a third predetermined threshold equal to around 11 µm.

11. The method according to claim 1, further comprising:
comparing said measured data representative of geometrical characteristics of said at least one sharp edge on said main surface to theoretical data according to said predetermined theoretical geometry, and
deducing, from said step of comparing, an offset location of said lens machining tool according to said second direction.

12. The method according to claim 11, further comprising controlling said turning machine for repositioning said lens machining tool according to said determined offset location according to said second direction, when said offset location according to said second direction is bigger than a fourth predetermined threshold equal to around 20 µm.

13. The method according to claim 1, wherein said lens machining tool includes a circular cutting edge (32) which is configured to have a waviness defect and/or worn portion smaller than around 2 µm when said manufacturing said calibration piece is carried out, said method further comprising:
manufacturing a first checking piece similar to said calibration piece by using said lens machining tool;
measuring geometrical characteristics of at least one sharp edge of said first checking piece and storing said measured data relating to said first checking piece;
manufacturing a plurality of ophthalmic lenses by using said lens machining tool;
manufacturing a second checking piece similar to said first checking piece by using said lens machining tool;
measuring geometrical characteristics of at least one sharp edge of said second checking piece; and
comparing said measured data relating to said second checking piece to said stored measured data relating to said first checking piece and deducing a wear value of said lens machining tool.

14. The method according to claim 1, wherein said manufacturing the calibration piece is carried out at a first height in said turning machine,
said method further comprising, after deducing said tool location according to said second direction:
storing said deduced tool location according to said first direction relating to said calibration piece;
manufacturing another calibration piece similar to said calibration piece, at a second height in said turning machine, distinct from said first height;
measuring geometrical characteristics of at least one sharp edge of said another calibration piece;
deducing, from said measured data representative of geometrical characteristics of said at least one sharp edge on said main surface of said another calibration piece, a tool location according to said second direction relating to said another calibration piece; and
comparing said deduced tool locations relating to said calibration piece and to said another calibration piece and deducing a parallelism defect value according to said second direction relating to said lens machining tool.

15. The method according to claim 14, wherein said lens machining tool has a parallelism defect value according to said first direction which corresponds to the difference between said deduced tool locations respectively relating to said calibration piece and said another calibration piece, and which is smaller than a sixth predetermined threshold defined according to the difference between said first height and said second height, so that a third error regarding said parallelism defect value according to said second direction, which is due to said parallelism defect value according to said first direction, is smaller than a seventh predetermined threshold equal to around 1 µm/mm.

16. The method for controlling a lens manufacturing process comprising:
determining the location of the lens machining tool in the turning machine according to claim 1;
recording the value of said location of said machining tool in said turning machine (1);

regularly repeating the determining the location and the recording the value and checking the evolution of the said location of said machining tool in said turning machine over time, wherein the evolution of at least one parameter of said turning machine during the lens manufacturing process is checked over time and the evolution over time of at least said location of said machining tool in said turning machine is related with the evolution over time of the at least one parameter of said turning machine.

17. The method according to claim 3, wherein said predetermined local slope has a value greater than around 10°.

18. The method of claim 9, wherein the second predetermined threshold is equal to around 5 μm.

19. The method of claim 9, wherein the second predetermined threshold is equal to around 1 μm.

20. The method of claim 10, wherein the predetermined local slope is around 10°.

* * * * *